(12) United States Patent
Okada et al.

(10) Patent No.: US 7,719,597 B2
(45) Date of Patent: May 18, 2010

(54) DISTORTION CORRECTION DEVICE AND IMAGE SENSING DEVICE PROVIDED THEREWITH

(75) Inventors: Seiji Okada, Hirakata (JP); Yukio Mori, Hirakata (JP); Atsufumi Kinoshita, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1357 days.

(21) Appl. No.: 11/091,346

(22) Filed: Mar. 29, 2005

(65) Prior Publication Data

US 2005/0213159 A1 Sep. 29, 2005

(30) Foreign Application Priority Data

Mar. 29, 2004 (JP) .............................. 2004-094595

(51) Int. Cl.
*H04N 5/225* (2006.01)
*H04N 5/228* (2006.01)

(52) U.S. Cl. ...................... 348/335; 348/340; 348/222.1

(58) Field of Classification Search ................. 348/335, 348/340, 241, 251; 382/275; 359/16
See application file for complete search history.

(56) References Cited

U.S. PATENT DOCUMENTS 5,675,380 A * 10/1997 Florent et al. ............... 348/251

| 5,818,527 | A  | * | 10/1998 | Yamaguchi et al. | 348/335 |
| 5,905,530 | A  | * | 5/1999  | Yokota et al.    | 348/241 |
| 6,747,702 | B1 | * | 6/2004  | Harrigan         | 348/335 |
| 6,937,282 | B1 | * | 8/2005  | Some et al.      | 348/340 |
| 7,301,565 | B2 | * | 11/2007 | Kurase           | 382/275 |
| 7,317,482 | B2 | * | 1/2008  | Sato et al.      | 348/335 |
| 2004/0207733 | A1 | * | 10/2004 | Nose et al.    | 348/222.1 |

FOREIGN PATENT DOCUMENTS

| EP | 1370091 A1 | 12/2003 |
| JP | 6-153065   | 5/1994  |
| JP | 6-165024   | 6/1994  |
| JP | 11-250239  | 9/1999  |

OTHER PUBLICATIONS

Chinese Office Action Issued in Chinese Patent Application No. CN 2005-10055899.8 dated on Apr. 11, 2008.
Feng "General Algorithm of Two Kinds of Cubic Spline Interpolation Functions" China Academic Journal Electronic Publishing House pp. 450-453 vol. 38, No. 4 Aug. 2003.

* cited by examiner

*Primary Examiner*—Nhan T Tran
(74) *Attorney, Agent, or Firm*—McDermott Will & Emery LLP

(57) ABSTRACT

Distortion data discretely stored in a distortion data memory 8 are read out by a selector 9 and fed to a signal processor 5. For each coordinate position, the signal processor 5 calculates an approximation formula representing an image height-distortion curve based on the distortion data fed thereto, and performs distortion correction based on the approximation formula.

12 Claims, 12 Drawing Sheets

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

DISTORTION CORRECTION DEVICE AND IMAGE SENSING DEVICE PROVIDED THEREWITH

This application is based on Japanese Patent Application No. 2004-94595 filed on Mar. 29, 2004, the contents of which are hereby incorporated by reference.

BACKGROUND OF THE INVENTION

1. Field of the Invention

The present invention relates to a distortion correction device that corrects an image signal obtained by image sensing for distortion produced by the lens used for the image sensing, and to an image sensing device provided with such a distortion correction device 2. Description of Related Art When an image is sensed with a solid-state image sensing device such as a CCD (charge-coupled device) or CMOS sensor through an optical lens, the aberrations produced by the optical lens cause the imaging positions on the solid-state image sensor to be displaced. Thus, if the image is reproduced for display directly from the image signal outputted from the solid-state image sensing device, the displayed image appears deformed. This deformation appearing in the displayed image is called distortion. Different types of distortion appear depending on the design of the optical lens and on the arrangement of the optical lens and the solid-state image sensing device relative to each other. One typical type of distortion is "pincushion-shaped distortion" in which the imaging positions are stretched compared with the ideal imaging positions as shown in FIG. 17A, and another is "barrel-shaped distortion" in which the imaging positions are shrunk compared with the ideal imaging positions as shown in FIG. 17B. In FIGS. 17A and 17B, dotted lines indicate the ideal image positions.

The value of distortion that appears as shown FIG. 17A or 17B varies non-linearly with respect to the image height, i.e., the distance from the optical axis of the optical lens to a given imaging position (corresponding to a given pixel position on the solid-state image sensing device). In one conventionally proposed image sensing device, the values of distortion corresponding to different pixel positions are stored in a data table, which is later referred to so that the distortion of the image is corrected for based on the values, stored in the data table, of distortion corresponding to different pixel positions. Disadvantageously, however, this image sensing device requires a large-capacity memory for the storage of distortion values corresponding to different pixel positions.

To overcome this disadvantage, in another conventionally proposed image sensing device, distortion (the distortion factor) D is approximated as proportional to the square of the image height, and a calculation circuit is provided that corrects for optical distortion based on distortion factors thus approximated. This eliminates the need for a memory for storing correction values corresponding to different pixel positions (see Japanese Patent Application Laid-Open No. H6-153065). In another conventionally proposed image sensing device, distortion values of an image is corrected with respect to an arbitrary image height so that distortion is corrected less in the negative direction. This, compared with when distortion is corrected with respect to the center of the image corresponding to the optical axis, permits the image to fill a wider area on the image sensing surface (see Japanese Patent Application Laid-Open No. H6-165024). In still another conventionally proposed image sensing device, through calculation performed based on a quadratic approximation polynomial by an approximation polynomial calculator, pixel positions before distortion correction corresponding to pixel positions after distortion correction are calculated, and interpolation calculation is performed differently for the brightness and color-difference signals corresponding to the thus calculated pixel positions before distortion correction (see Japanese Patent Application Laid-Open No. H11-250239).

With the image sensing device proposed in Japanese Patent Application Laid-Open No. H6-153065 mentioned above, simply providing the calculation circuit makes it possible to correct for distortion based on distortion values without using a memory for storing correction values corresponding to different pixel positions. This, however, cannot deal with all types of distortion, because not all distortion is proportional to the square of the image height. With the image sensing device proposed in Japanese Patent Application Laid-Open No. H6-165024 mentioned above, distortion is evaluated with respect to a circle rather than the center corresponding to the optical axis, and this permits the image sensing surface of the image sensing device to be used as efficiently as possible. Here, however, the approximation formula is determined according to the zoom position, and either the approximation formula itself or the correction values corresponding to different pixel positions as calculated based on it are stored in a memory. Thus, when correction values corresponding to different pixel positions are stored, a large-capacity memory is needed.

With the image sensing device proposed in Japanese Patent Application Laid-Open No. H 11-250239 mentioned above, for signals after distortion correction using the approximation formula, brightness signals, to which the sensitivity of the human eye is high, are calculated by an interpolation formula that requires much calculation, and color-difference signals, to which the sensitivity of the human eye is low, are calculated by an interpolation formula that requires less calculation. Thus, even when a lens that produces large distortion is used, calculation can be performed quickly. However, for the approximation formula used for distortion correction of coordinate positions, the coefficients for the approximation formula as determined according to the focal length are stored. Thus, when the actual focal length differs from the set focal length, the coefficients for the approximation formula cannot be calculated.

SUMMARY OF THE INVENTION

In view of the conventionally encountered problems discussed above, it is an object of the present invention to provide a distortion correction device that achieves distortion correction by using, for different pixel positions, approximation formulae that suit their respective image heights, and an image sensing device provided with such a distortion correction device.

To achieve the above object, in one aspect of the present invention, a distortion correction device that performs distortion correction on an inputted image signal by converting an input coordinate position, i.e., the coordinate position of the inputted image signal, is provided with: a distortion data memory that stores distortion data, which are discrete points on an image height-distortion curve representing the relationship between image height, which is the distance from the optical axis of the optical lens to an imaging position, and distortion, which shows the correlation between an output coordinate position, i.e., the coordinate position of an outputted image signal, and the input coordinate position corresponding thereto; a distortion calculator that reads out from the distortion data memory a predetermined number of distortion data near the image height at the output coordinate position, that then calculates an approximation formula for approximating the image height-distortion curve near the image height at the output coordinate position, and that then substitute the image height at the output coordinate position in the approximation formula in order to calculate the distortion at the output coordinate position; and a coordinate calculator that calculates the input coordinate position based on the output coordinate position and the distortion calculated by the distortion calculator as corresponding to the output coordinate position. Here, as the data of the output coordinate position, the data of the input coordinate position obtained for the output coordinate position are outputted.

In another aspect of the present invention, an image sensing device is provided with: an optical system built with a lens; a lens driver-controller for changing the position of the lens of the optical system; and a distortion correction processor that performs distortion correction on an inputted image signal by converting an input coordinate position, i.e., the coordinate position of the inputted image signal. Here, the distortion correction processor is provided with: a distortion data memory that stores a plurality of sets of distortion data, which are discrete points on an image height-distortion curve representing the relationship between image height, which is the distance from the optical axis of the optical lens to an imaging position, and distortion, which shows the correlation between an output coordinate position, i.e., the coordinate position of an outputted image signal, and the input coordinate position corresponding thereto; a distortion calculator that reads out from the distortion data memory a predetermined number of distortion data near the image height at the output coordinate position, that then calculates an approximation formula for approximating the image height-distortion curve near the image height at the output coordinate position, and that then substitute the image height at the output coordinate position in the approximation formula in order to calculate the distortion at the output coordinate position; and a coordinate calculator that calculates the input coordinate position based on the output coordinate position and the distortion calculated by the distortion calculator as corresponding to the output coordinate position. Moreover, as the data of the output coordinate position, the data of the input coordinate position obtained for the output coordinate position are outputted, and, according to the position of the lens set by the lens driver-controller, which of the sets of distortion data to read out from the distortion data memory is determined.

According to the present invention, several distortion data, i.e., discrete points on an image height-distortion curve, are stored, and, according to a plurality of distortion data near the image height of the output coordinate position, it is possible to calculate the approximation formula representing the image height-distortion curve near the image height of the output coordinate position. In this way, it is possible to reduce the amount of data that needs to be stored for the reproduction of the image height-distortion curve. Moreover, it is possible to reduce the amount of calculation that needs to be performed to obtain a highly accurate approximation curve, and thus to achieve distortion correction with high accuracy.

Moreover, edge enhancement can be performed simultaneously, and the parameters used for that purpose can be varied according to the image height, distortion, or coordinate position. Thus, it is possible to perform edge enhancement that suits given coordinate positions, and thereby prevent loss of resolution resulting from interpolation. Moreover, for different chrominance signals, approximation formulae based on different image height-distortion curves can be calculated.

Thus, simultaneously with distortion correction on coordinate positions, it is possible to correct chromatic aberrations resulting from different refractive indices for different colors. Furthermore, it is possible to set the distortion data according to the degree in which to distort the image represented by the outputted image signal. This makes it easy to generate an image signal that suits the way an image desired to be displayed.

BRIEF DESCRIPTION OF THE DRAWINGS

FIG. 13 is a diagram showing the structure of the filter provided on the solid-state image sensor;

FIGS. 15A to 15D are diagrams illustrating the operation for color correction;

DETAILED DESCRIPTION OF PREFERRED EMBODIMENTS

First Embodiment

Figure 1:
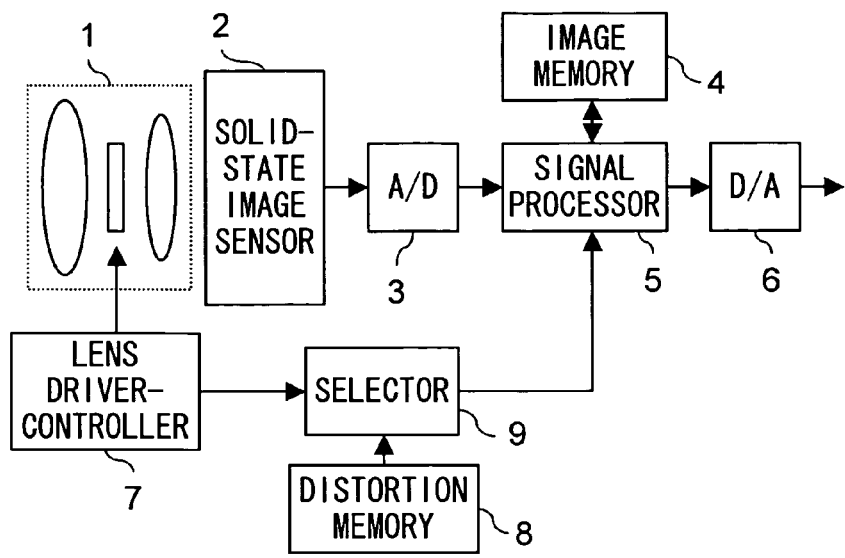
FIG. 1 is a block diagram showing the internal configuration of the image sensing devices of a first to a third embodiment of the invention.
Figure 4:
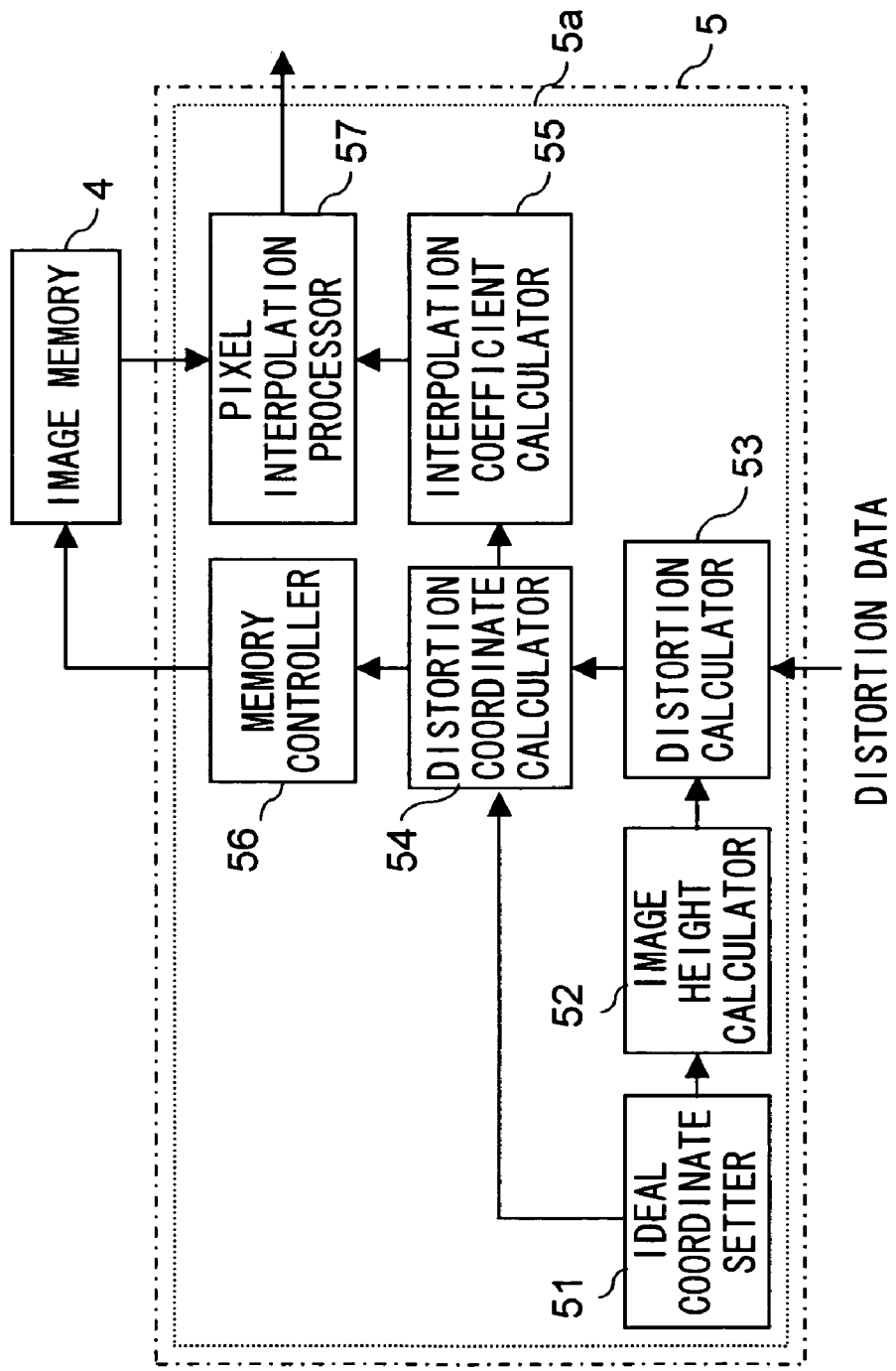
FIG. 4 is a block diagram showing the internal configuration of the signal processor in the image sensing device of the first embodiment.

A first embodiment of the present invention will be described below with reference to the drawings. FIG. 1 is a block diagram showing the internal configuration of the image sensing device of this embodiment. FIG. 4 is a block diagram showing the internal configuration of the signal processor provided in the image sensing device of this embodiment.

The image sensing device shown in FIG. 1 is provided with: an optical system 1 that receives the light from a subject and that is composed of a plurality of lenses; a solid-state image sensor 2, such as a CCD or CMOS sensor, that receives the light incident thereon through the optical system 1 and that outputs an electrical signal commensurate with the amount of incident light; an A/D converter 3 that converts the image signal outputted from the solid-state image sensor 2 into a digital signal; an image memory 4 that temporarily stores the image signal; a signal processor 5 that reads out the image signal stored in the image memory 4 and that then performs various kinds of signal processing thereon; a D/A converter 6 that converts the image signal processed by the signal processor 5 into an analog signal; a lens driver-controller 7 that sets the zoom position and focus position of the lenses provided in the optical system 1; a distortion data memory 8 that stores distortion data, of which a description will be given later, with which to perform distortion correction; and a selector 9 that selects and reads out the distortion data stored in the distortion data memory 8 according to the zoom position and focus position set by the lens driver-controller 7.

Figure 2A:
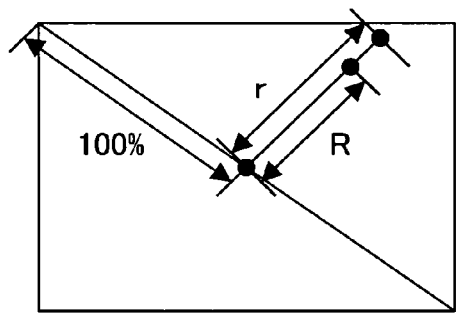
FIGS. 2A to 2E are diagrams showing the relationship between the coordinate position on the solid-state image sensor, the image height, and the distortion.

Now, a description will be given of the distortion data that is stored in the distortion data memory 8 of the image sensing device configured as described above. Distortion is a quantity that varies with the image height, i.e., the distance from the optical axis, which runs through the center of the optical system 1, to the imaging position. Specifically, suppose that FIG. 2A shows the effective area on the solid-state image sensor 2; then, distortion D varies with the image height r, which represents the relative distance from the center of (i.e., the point at which the optical axis of the optical system 1 passes through) the effective area of the solid-state image sensor 2. Here, the image height r is given as a relative distance from the center of the effective area of the solid-state image sensor 2, i.e., in percentage relative to the distance, let this distance be 100%, from the center of the effective area to the corners thereof.

For the image height r of a given imaging position at which distortion causes imaging to actually take place on the effective area of the solid-state image sensor 2, let the image height of the ideal imaging position at which a distortionless optical system would cause imaging to take place be R. Then, in terms of the image height r of the actual imaging position and the image height R of the ideal imaging position, distortion D is given by $$D=(r-R)/R \times 100(\%).$$

Figure 2B:
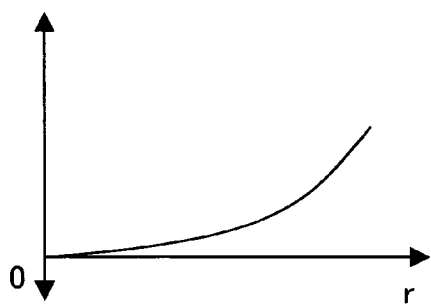
Figure 2C:
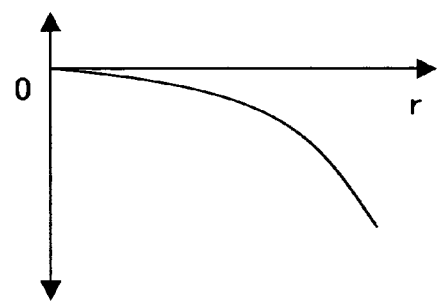
Figure 2D:
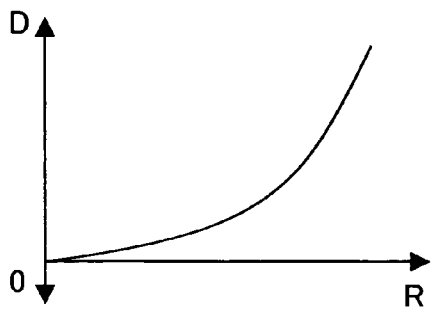
Figure 2E:
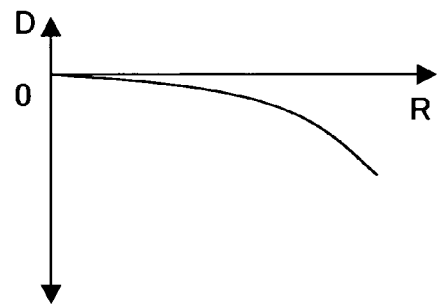

With this definition of distortion D, if pincushion-shaped distortion is produced, the distortion D is positive, and non-linearly increases with the image height r of the actual imaging position as shown in FIG. 2B; by contrast, if barrel-shaped distortion is produced, the distortion D is negative, and non-linearly decreases with the image height r of the actual imaging position as shown in FIG. 2C. To simplify the calculation that is performed in the course of the signal processing to calculate the actual imaging coordinate positions, this distortion D in terms of the image height r of the actual imaging position is converted into distortion D in terms of the image height R of the ideal imaging position; specifically, it is converted into a plurality of discrete points (R, D) on an image height-distortion curve, as shown in FIGS. 2D and 2E, that represents the variation of distortion D with respect to the image height R of the ideal imaging position. The results of this conversion are then, as distortion data, stored in the distortion data memory 8.

Figure 3A:
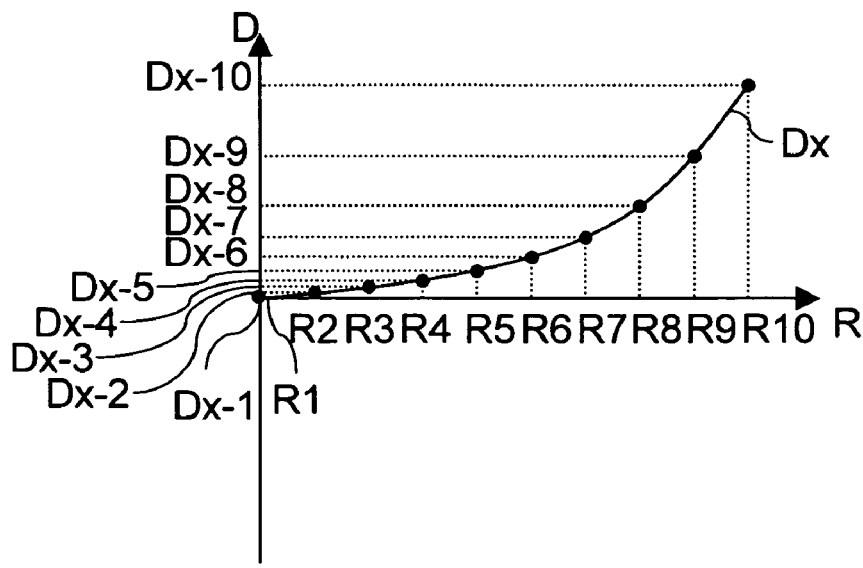
FIGS. 3A and 3B are diagrams illustrating the distortion data stored in the distortion data memory.

Specifically, when the image height-distortion curve Dx that represents the relationship between the distortion D and the image height R of the ideal imaging position is as shown in FIG. 3A, the image height and distortion D at each of n discrete points (in the example shown in FIG. 3, ten points) on the image height-distortion curve Dx are stored as distortion data. Here, the values (R1, Dx-1), (R2, Dx-2), . . . , and (Rn, Dx-n) at the discrete points on the image height-distortion curve Dx shown in FIG. 3A are stored as distortion data dx-1, dx-2, . . . , and dx-n. In the following descriptions, to simplify the explanation of the operations performed, the difference in image height between any two adjacent discrete points on the image height-distortion curve Dx is fixed at ΔR. That is, the image height and distortion at discrete points sampled at fixed image height intervals AR are stored as distortion data. In practice, the differences in image height do not necessarily have to be fixed, but may be arbitrary.

Figure 3B:
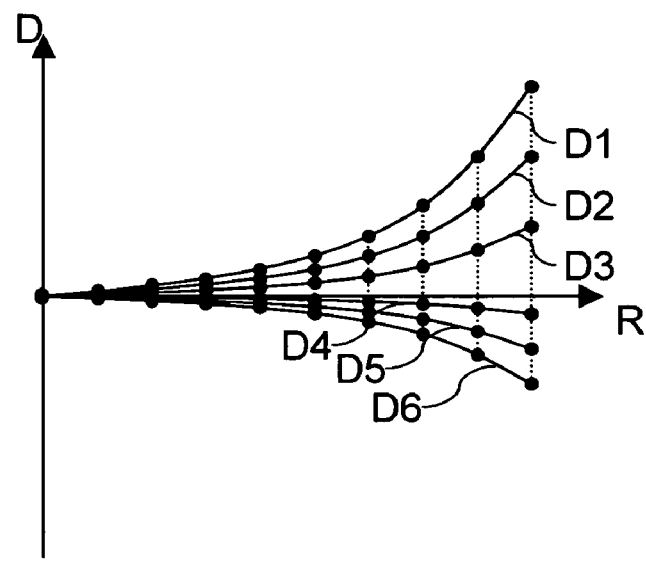

Moreover, as shown in FIG. 3B, according to the zoom position or focus position set by the lens driver-controller 7, m image height-distortion curves (in the example shown in FIG. 3B, six curves) D1, D2, . . . , and Dm are determined. Here, for each of these m image height-distortion curves D1, D2, . . . , and Dm, n distortion data d1-1 to d1-n, d2-1 to d2-n, . . . , and dm-1 to dm-n are stored; that is, in total n x m distortion data are stored. These distortion data are (R1, D1-1), (R2, D1-2), . . . , (Rn, D1-n), (R1, D2-1), (R2, D2-2), . . . , (Rn, D2-n), . . . , (R1, Dm-1), (R2, Dm-2), . . . , and (Rn, Dm-n).

Of the n x m distortion data thus stored in the distortion data memory 8, the n distortion data representing one image height-distortion curve is selected by the selector 9 according to the zoom position or focus position set by the lens driver-controller 7. That is, if the selector 9 confirms that the image height-distortion curve set according to the zoom position or focus position set by the lens driver-controller 7 is Dk ($1 \leq k \leq m$), it reads out from the distortion data memory 8 the distortion data dk-1 to dk-n that represent that image height-distortion curve Dk.

The image memory 4 receives through the signal processor 5 an image signal from the A/D converter 3, and stores the data of the individual pixels represented by the image signal according to the coordinate positions of the pixels arrayed in a matrix in the solid-state image sensor 2. The data of the individual pixels of the solid-state image sensor 2 stored in the image memory 4 are read out by the signal processor 5, and then signal processing is performed by using the data of the individual pixels thus read out. The signal processor 5 is built as a distortion correction processor 5a as shown in FIG. 4.

The distortion correction processor 5a shown in FIG. 4 is provided with: an ideal coordinate setter 51 that sets the coordinate position (X, Y) (hereinafter referred to as the "ideal coordinates") of the ideal imaging position; an image height calculator 52 that calculates the image height Rx from the ideal coordinates (X, Y) set by the ideal coordinate setter 51; a distortion calculator 53 that calculates the distortion Dx corresponding to the image height Rx calculated by the image height calculator 52; a distortion coordinate calculator 54 that calculates, from the distortion Dx calculated by the distortion calculator 53 and the ideal coordinates (X, Y) set by the ideal coordinate setter 51, the coordinate position (x, y) (hereinafter referred to as the "actual coordinates") at which imaging actually takes place; an interpolation coefficient calculator 55 that calculates the interpolation coefficient for calculating the data of the actual coordinates (x, y) calculated by the distortion coordinate calculator 54; a memory controller 56 that identifies the coordinate positions (hereinafter referred to as the "coordinates of interpolation-oriented surrounding pixels") of pixels present near the actual coordinates (x, y) calculated by the distortion coordinate calculator 54 and that instructs the image memory 4 to output the data of the coordinates of the interpolation-oriented surrounding pixels; and a pixel interpolation processor 57 that interpolates the data of the coordinates of the interpolation-oriented surrounding pixels outputted from the image memory 4 by using the interpolation coefficient calculated by the interpolation coefficient calculator 55 and that then outputs the results as the data of the ideal coordinates (X, Y).

Figure 5:
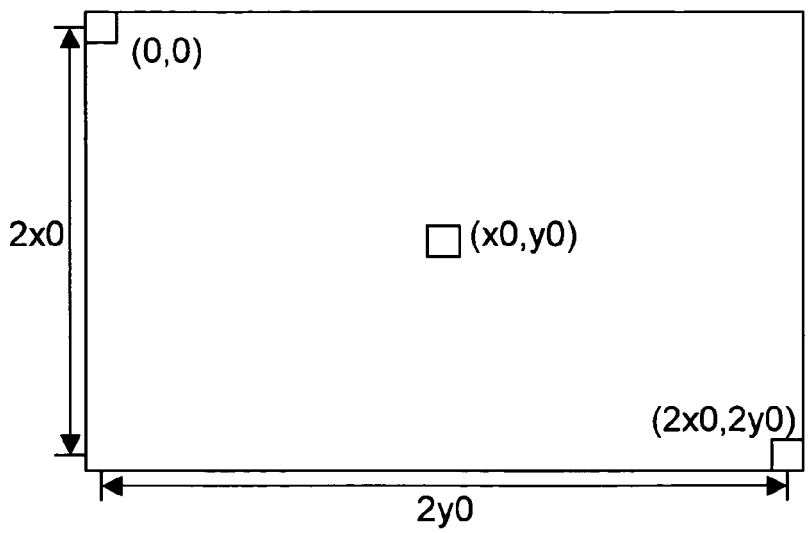
FIG. 5 is a diagram showing the relationship between the pixels and their coordinate positions on the solid-state image sensor.

Configured as described above, the distortion correction processor 5a operates as follows. Here, assume that, in the solid-state image sensor 2, 2x0+1 pixels are arrayed horizontally and 2y0+1 pixels are arrayed vertically as shown in FIG. 5. Moreover, in this solid-state image sensor 2, the pixel at the upper left corner serves as the origin (0, 0) with respect to which the coordinate position of any other pixel is expressed. Thus, the individual pixels have coordinate positions (0, 0) to (2x0, 2y0). Accordingly, the coordinate position at the center of the solid-state image sensor 2 (where the optical axis of the lenses constituting the optical system 1 passes through it) is (x0, y0). The ideal coordinates (X, Y) and the actual coordinates (x, y) are both given as coordinate positions relative to the origin (0, 0) shown in FIG. 5.

With coordinate positions set as described above, when the ideal coordinate setter 51 sets ideal coordinates (X, Y) as one of all the sets of the ideal coordinates (0, 0) to (2x0, 2y0), those are fed to the image height calculator 52 and to the distortion coordinate calculator 54. The image height calculator 52 then calculates the image height Rx from the position of the ideal coordinates (X, Y) relative to the center coordinates (x0, y0). Specifically, the image height calculator 52 calculates the image height Rx at the ideal coordinates (X, Y) by using the calculation formula below.

$$Rx=((X-x0)^2+(Y-y0)^2)^{1/2}/(x0^2+y0^2)^{1/2}$$

When image height Rx corresponding to the ideal coordinates (X, Y) is calculated in this way, the calculated image height Rx is fed to the distortion calculator 53. This distortion calculator 53 receives the distortion data dk-1 to dk-n representing the image height-distortion curve Dk selected by the selector 9. Then, by using the distortion data dk-a, dk-b, dk-c, and dk-d at four discrete points Va to Vd on the image height-distortion curve Dk that are located near the image height Rx calculated by the image height calculator 52, the distortion calculator 53 calculates the approximation formula f(R) for the curve between the discrete points Vb and Vc corresponding to the distortion data dk-b and dk-c.

Figure 6A:
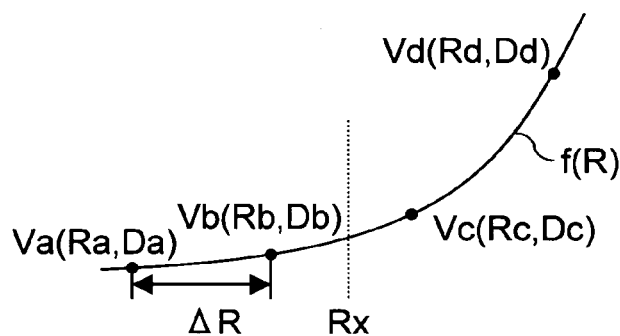
FIGS. 6A and 6B are diagrams illustrating the method for calculating the approximation formula of the image height-distortion curve.

Incidentally, the four discrete points represented by the distortion data dk-a to dk-d are mutually adjacent discrete points on the image height-distortion curve Dk as shown in FIG. 6A, and the image height Rx is located between the two discrete points Vb and Vc represented by the distortion data dk-b and dk-c. Moreover, the distortion data dk-a, dk-b, dk-c, and dk-d at the discrete points Va, Vb, Vc, and Vd are expressed as (Ra, Da), (Rb, Db), (Rc, Dc), and (Rd, Dd). Here, Rb=Ra+ΔR, Rc=Ra+2×ΔR, and Rd=Ra+3×ΔR.

Figure 6B:
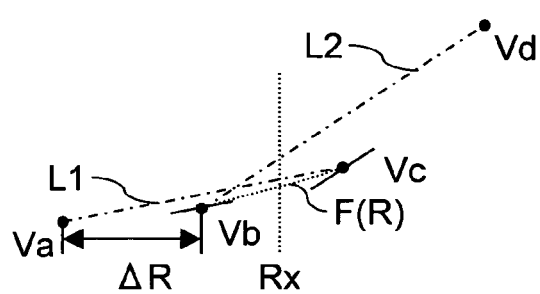

Here, first, between the discrete points Vb and Vc, the difference in image height Rc−Rb=ΔR and the difference in distortion Dc−Db=ΔD are calculated. Moreover, as shown in FIG. 6B, the slope t1 of the line L1 connecting the discrete points Va and Vc together and the slope t2 of the line L2 connecting the discrete points Vb and Vd together are calculated respectively by the formulae below.

$$t1=(Dc-Da)/(Rc-Ra)=(Dc-Da)/(2\times\Delta R)$$

$$t2=(Dd-Db)/(Rd-Rb)=(Dd-Db)/(2\times\Delta R)$$

Next, assuming that the curve described by the discrete points Vb and Vc has the origin (0, 0) at the discrete point Vb, a cubic equation $F(R)=A\times R^3+B\times R^2+C\times R$ is calculated as the approximation formula. Here, the coefficients in the approximation formula F(R) are so determined as to fulfill the conditions expressed by formulae (1) to (3) noted below; specifically, they are so determined that (1) the curve described by the approximation formula F(R) passes through the discrete point Vc expressed as (ΔR, ΔD), that (2) the slope of the tangent at the discrete point Vb is equal to the slope t1 of the line L1, and that (3) the slope of the tangent at the discrete point Vc is equal to the slope t2 of the line L2.

$$F(\Delta R)=A\times(\Delta R)^3+B\times(\Delta R)^2+C\times(\Delta R)=\Delta D \quad (1)$$

$$F'(0)=3A\times0^2+2B\times0+C=C=t1 \quad (2)$$

$$F'(\Delta R)=3A\times(\Delta R)^2+2B\times(\Delta R)+C\times=t2 \quad (3)$$

Thus, the coefficients A to C that fulfill the conditions expressed by formulae (1) to (3) noted above are calculated as noted below. Then, by translating the F(R) with the thus calculated coefficients A to C over the distance corresponding to the coordinates (Ra+×R, Db) of the discrete point Vb, the f(R) is calculated as noted below.

$$A=-(2\times\Delta D-\Delta R\times(t1+t2))/(\Delta R)^3$$

$$B=-(2\times t1+t2-3\times\Delta D/\Delta R)/\Delta R$$

$$C=t1$$

$$f(R)=A\times(R-Rb)^3+B\times(R-Rb)^2+C\times(R-Rb)+Db$$

By substituting the image height Rx fed from the image height calculator 52 in the approximation formula f(R) thus calculated, the distortion Dx=f(Rx) is calculated. The calculated distortion Dx is then fed to the distortion coordinate calculator 54. The distortion coordinate calculator 54 calculates, from the distortion Dx calculated by the distortion calculator 53 and the ideal coordinates (X, Y) set by the ideal coordinate setter 51, the actual coordinates (x, y) corresponding to the ideal coordinates (X, Y). Specifically, the horizontal coordinate (x) and vertical coordinate (y) at the actual coordinates (x, y) have the values given by the formulae below.

$$x=(X-x0)\times(1+Dx/100)+x0$$

$$y=(Y-x0)\times(1+Dx/100)+y0$$

When the actual coordinates (x, y) are calculated by the distortion coordinate calculator 54 in this way, they are then fed to the interpolation coefficient calculator 55 and to the memory controller 56. Then, the interpolation coefficient calculator 55 and the memory controller 56 each check whether or not the values of the horizontal and vertical coordinates (x) and (y) of the calculated actual coordinates (x, y) are each an integer. Specifically, assuming that xi and yi represent integers, that xd and yd represent decimals, and that x=xi+xd and y=yi+yd, whether or not xd equals 0 and whether or not yd equals 0 are checked.

Figures 7C, 7D:
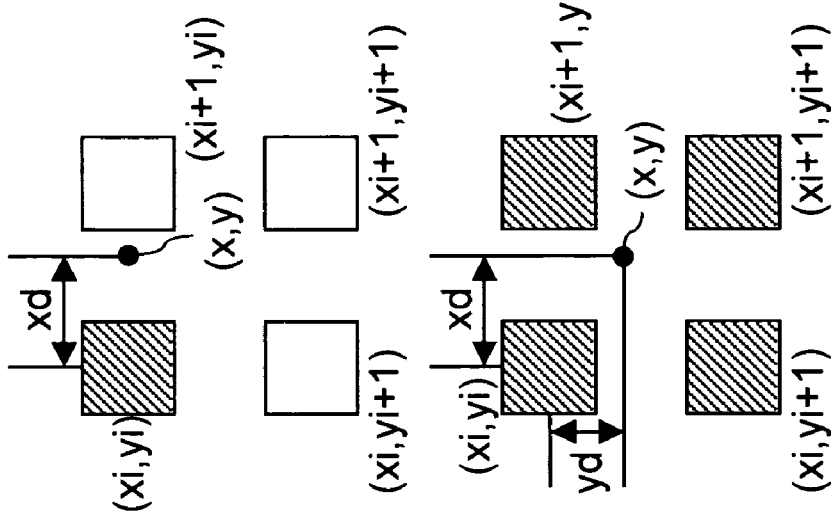
FIGS. 7A to 7D are diagrams illustrating the operations for interpolation coefficient calculation and for interpolation.
Figure 7A:
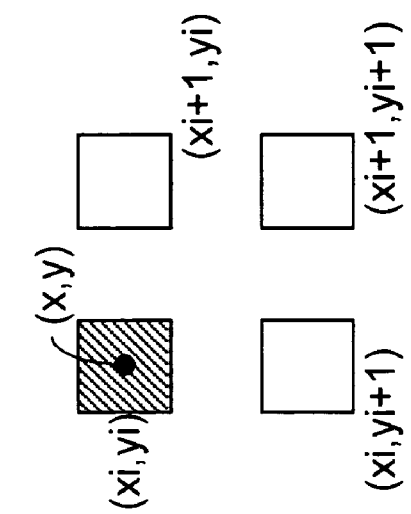

If xd and yd are both equal to 0, the actual coordinates (x, y) coincide with the coordinates (xi, yi), and thus, as shown FIG. 7A, the memory controller 56 gives an instruction that the data of the pixel at the coordinate position (xi, yi) be outputted from the data memory 4. In this case, the interpolation coefficient calculator 55 sets the interpolation coefficient equal to 1 so that the data of the pixel at (xi, yi) are used intact. Thus, the pixel interpolation processor 57 outputs, as the data of the ideal coordinates (X,Y), the data dii of the pixel at the coordinate position (xi, yi) as outputted from the data memory 4.

Figure 7B:
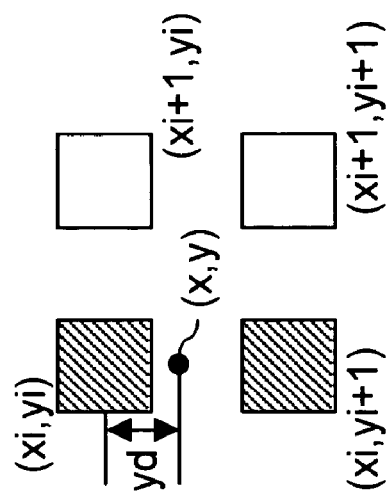

If xd is equal to 0 but yd is not equal to 0, as shown in FIG. 7B, the two pixels at the coordinate positions (xi, yi) and (xi, yi+1) are identified as interpolation-oriented surrounding pixels, and the memory controller 56 gives an instruction that the data of the pixels at the coordinate positions (xi, yi) and (xi, yi+1) be outputted from the data memory 4. In this case, based on how the actual coordinates (x, y) and the coordinate positions (xi, yi) and (xi, yi+1) are located relative to each other, the interpolation coefficient calculator 55 sets the interpolation coefficient equal to yd. Thus, the pixel interpolation processor 57 outputs, as the data of the ideal coordinates (X, Y), the data (1−yd) x dii+yd x di(i+1) obtained by interpolating, with the interpolation coefficient yd, the data dii and di(i+1) of the pixels at the coordinate positions (xi, yi) and (xi, yi+1) as outputted from the data memory 4.

If yd is equal to 0 but xd is not equal to 0, as shown in FIG. 7C, the two pixels at the coordinate positions (xi, yi) and (xi+1, yi) are identified as interpolation-oriented surrounding pixels, and the memory controller 56 gives an instruction that the data of the pixels at the coordinate positions (xi, yi) and (xi+1, yi) be outputted from the data memory 4. In this case, based on how the actual coordinates (x, y) and the coordinate positions (xi, yi) and (xi+1, yi) are located relative to each other, the interpolation coefficient calculator 55 sets the interpolation coefficient equal to xd. Thus, the pixel interpolation processor 57 outputs, as the data of the ideal coordinates (X, Y), the data (1−xd) x dii+xd×d(i+1)i obtained by interpolating, with the interpolation coefficient xd, the data dii and d(i+1)i of the pixels at the coordinate positions (xi, yi) and (xi+1, yi) as outputted from the data memory 4.

If xd and yd are both not equal to 0, as shown in FIG. 7D, the four pixels at the coordinate positions (xi, yi), (xi, yi+1), (xi+1, yi), and (xi+1, yi+1) are identified as interpolation-oriented surrounding pixels, and the memory controller 56 gives an instruction that the data of the pixels at the coordinate positions (xi, yi), (xi, yi+1), (xi+1, yi), and (xi+1, yi+1) be outputted from the data memory 4. In this case, based on how the actual coordinates (x, y) and the coordinate positions (xi, yi), (xi, yi+1), (xi+1, yi), and (xi+1, yi+1) are located relative to each other, the interpolation coefficient calculator 55 sets the interpolation coefficients equal to xd and yd. Thus, the pixel interpolation processor 57 outputs, as the data of the ideal coordinates (X, Y), the data (1−yd)×((1−xd)×dii+xd×d(i+1)i )+yd×((1−xd)−di(i+1)+xd×d(i+1)(i+1)) obtained by interpolating, with the interpolation coefficients xd and yd, the data dii, di(i+1), d(i+1)i, and d(i+1)(i+1) of the pixels at the coordinate positions (xi, yi), (xi, yi+1), (xi+1, yi), and (xi+1, yi+1) as outputted from the data memory 4.

In this way, the data at each of the ideal coordinates (0, 0) to (2x0, 2y0) are interpolated by the pixel interpolation processor 57, so that data corrected for distortion are outputted to the D/A converter 6. Here, when how the actual coordinates (x, y) and the coordinate positions of interpolation-oriented surrounding pixels are located relative to each other is checked, only the interpolation-oriented surrounding pixel at the coordinate position (xi, yi) may be checked so that, by checking the horizontal and vertical positional relationship between the actual coordinates (x, y) and the coordinate position (xi, yi), the interpolation coefficient is confirmed.

In a case where the distortion data stored in the distortion data memory 8 are sampled with a fixed image height ΔR of $2^{\alpha}$, the formulae for calculating the coefficients A and B in the approximation formula f(R) calculated by the distortion calculator 53 may be replaced with the formulae noted below. This eliminates the need for division circuits. It should be noted that, in the formulae noted below the symbol "a >>b" denotes that "a" is shifted "b" bits rightward (to a lower positions).

$$A = -((2 \times \Delta D) >> (3 \times \alpha)) + ((t1 + t2) >> (2 \times \alpha))$$

$$B = -((2 \times t1 + t2) >> \alpha) + ((3 \times \Delta D) >> (2 \times \alpha))$$

Moreover, in the distortion data memory 8 are stored, as shown in FIG. 3B, distortion data composed of discrete points on m image height-distortion curves D1, D2, . . . , and Dm corresponding to the m zoom positions or focus positions set by the lens driver-controller 7. Here, when a zoom position or focus position other than the m zoom positions or focus positions is set, the distortion data of a plurality of image height-distortion curves corresponding to the zoom positions or focus positions in front of and behind the set one may be interpolated to generate distortion data corresponding to the set zoom position or focus position.

Furthermore, every time the ideal coordinate setter 51 sets ideal coordinates, the selector 9 may select the necessary distortion data from the distortion data memory 8 and feed them to the distortion calculator 53. Here, the distortion calculator 53 may make the selector 9 operate according to the image height calculated by the image height calculator 52 so that the selector 9 selects the necessary distortion data from the distortion data memory 8 and feed them to the distortion calculator 53.

Second Embodiment

Figure 8:
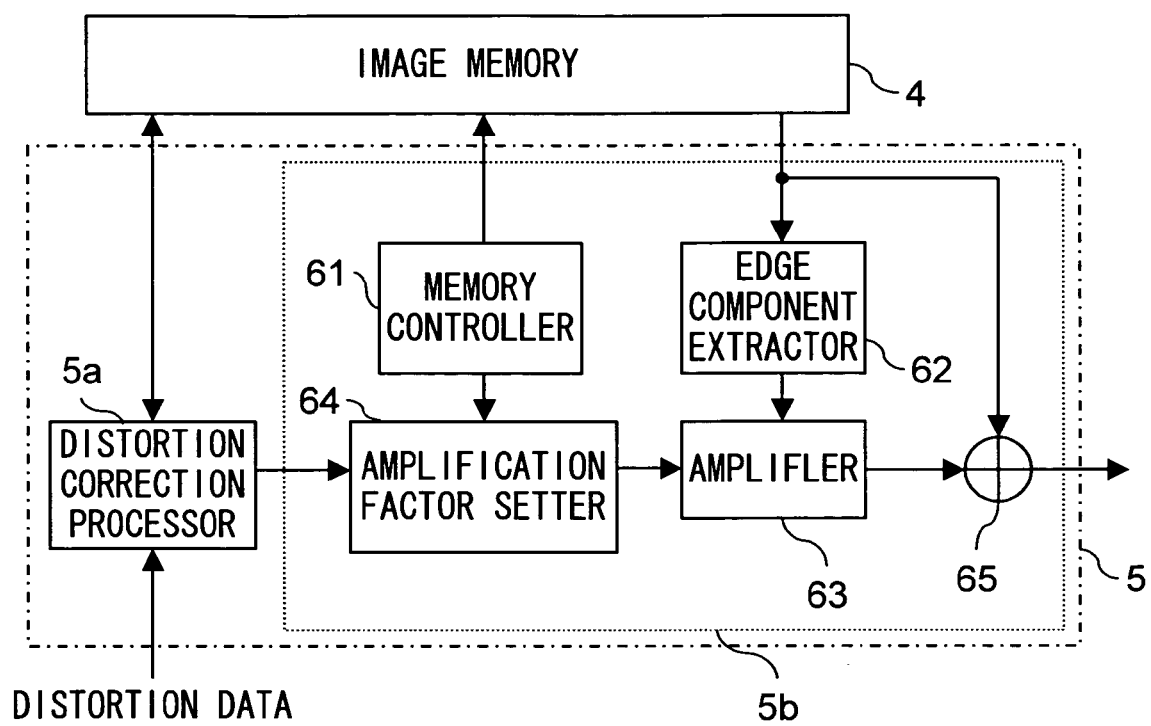
FIG. 8 is a block diagram showing the internal configuration of the signal processor in the image sensing device of the second embodiment.

A second embodiment of the present invention will be described below with reference to the drawings. The image sensing device of this embodiment is, as in the first embodiment, configured as shown in FIG. 1. FIG. 8 is a block diagram showing the internal configuration of the signal processor provided in the image sensing device of this embodiment. The image sensing device of this embodiment differs from the image sensing device of the first embodiment in that the signal processor 5 performs not only distortion correction but also edge enhancement. Thus, in this embodiment, except the signal processor 5, all the circuit blocks are configured in the same manners and operate in the same manners as in the first embodiment; therefore, for their explanations, those given earlier in connection with the first embodiment are to be referred to, and no detailed explanations will be repeated.

In the image sensing device of this embodiment, as shown in FIG. 8, the signal processor 5 is provided with: a distortion correction processor 5a just like the one used in the first embodiment; and an edge enhancement processor 5b that extracts edge components by performing second-order differentiation or the like and that adds those edge components to the original image signal to achieve edge enhancement. The edge enhancement processor 5b shown in FIG. 8 is provided with: a memory controller 61 that specifies the pixels for which to read out data from the image memory 4; an edge component extractor 62 that extracts the edge component corresponding to each pixel by performing second-order differentiation or coring on the data of a plurality of pixels including a target pixel as read out from the image memory 4; an amplifier 63 that amplifies by an amplification factor β the edge component extracted by the edge component extractor 62; an amplification factor setter 64 that sets the amplification factor β for each target pixel; and an adder 65 that adds the edge component amplified by the amplifier 63 to the data of the target pixel read out from the image memory 4. The distortion correction processor 5a is, as in the first embodiment, configured as shown in FIG. 4.

Configured as described above, the signal processor 5 operates as follows. For the operation of the distortion correction processor 5a, however, the relevant explanations given earlier in connection with the first embodiment are to be referred to, and no detailed explanations will be repeated. Specifically, as the result of the individual circuit blocks of the distortion correction processor 5a operating in the same manners as in the first embodiment, distortion correction is performed, and the data corresponding individually to the ideal coordinates (0, 0) to (2x0, 2y0) are outputted from the pixel interpolation processor 57. The data corresponding individually to the ideal coordinates (0, 0) to (2x0, 2y0) as outputted from the pixel interpolation processor 57 in this way are stored in the image memory 4 at the addresses corresponding to their coordinate positions.

When the distortion-corrected data corresponding individually to the ideal coordinates (0, 0) to (2x0, 2y0) are stored in the image memory 4 in this way, one data after another is read out from the image memory 4, starting from the ideal coordinates (0, 0), as a target pixel for which to perform edge enhancement. Read out together from the image memory 4 are the data of a plurality of edge-enhancement-oriented surrounding pixels horizontally and vertically adjacent to the target pixel. Here, the memory controller 61 specifies the addresses in the image memory 4 in such a way that the data of the target pixel and of the edge-enhancement-oriented surrounding pixels are read out therefrom. The data of the target pixel and of the edge-enhancement-oriented surrounding pixels thus read out are then fed to the edge component extractor 62, which then extracts the edge component ed corresponding to the target pixel.

Here, the amplification factor setter 64 sets the amplification factor $\beta$ according to the image height or distortion corresponding to the coordinate position of the target pixel. How the amplification factor setter 64 sets the amplification factor $\beta$ will be described later. When the edge component ed extracted by the edge component extractor 62 and the amplification factor $\beta$ set by the amplification factor setter 64 are fed to the amplifier 63, the edge component ed is amplified by the amplification factor $\beta$ so that $\beta \times$ed is outputted. When the data d of the target pixel read out from the image memory 4 and the edge component $\beta \times$ed amplified by the amplifier 63 are fed to the adder 65, they are added together in the adder 65 so that d+$\beta \times$ed is fed as the data of the target pixel to the D/A converter 6. As the result of the individual circuit blocks operating in this way, edge enhancement is performed by the edge enhancement processor 5b on the image signal that has undergone distortion correction by the distortion correction processor 5a.

Now, different examples of how, in the edge enhancement processor 5b operating as described above, the amplification factor setter 64 sets the amplification factor $\beta$ will be described.

1. First Example of the Operation for Setting the Amplification Factor $\beta$

In this example, the amplification factor setter 64 receives the image height calculated by the image height calculator 52 provided in the distortion correction processor 5a; that is, it receives from the image height calculator 52 the image height Rx of the coordinate position of the target pixel that is instructed to be read by the memory controller 61. Here, the image height Rx calculated by the image height calculator 52 as corresponding to the ideal coordinates set by the ideal coordinate setter 51 may be delayed and then fed to the amplification factor setter 64 of the edge enhancement processor 5b so that eventually the image height Rx at the coordinate position of the target pixel is fed to the amplification factor setter 64.

Figure 9:
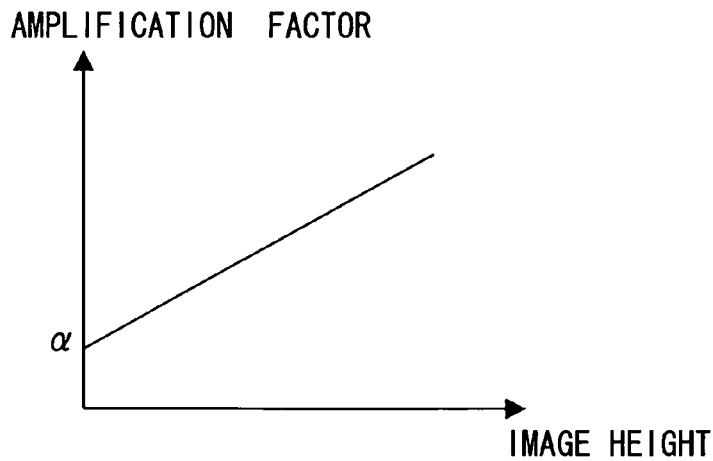
FIG. 9 is a graph showing the relationship between the image height and the amplification factor for edge components.

Then, based on the relationship shown in FIG. 9, the amplification factor $\beta$ corresponding to the image height Rx of the target pixel fed from the image height calculator 52 is calculated. Incidentally, FIG. 9 is a graph showing the relationship between the amplification factor $\beta$ and the image height Rx, and shows that the amplification factor $\beta$ increases as the image height Rx increases. In this way, the edge component amplified by the amplifier 63 is made to increase as the image height Rx increases. Thus, the greater the image height, and thus the greater the distortion, the higher the degree of the edge enhancement performed.

2. Second Example of the Operation for Setting the Amplification Factor $\beta$

In this example, the amplification factor setter 64 receives the distortion Dx=f(Rx) calculated by the distortion calculator 53 provided in the distortion correction processor 5a; that is, it receives from the distortion calculator 53 the distortion Dx at the coordinate position of the target pixel that is instructed to be read by the memory controller 61. Here, the distortion Dx calculated by the distortion calculator 53 as corresponding to the ideal coordinates set by the ideal coordinate setter 51 may be delayed and then fed to the amplification factor setter 64 of the edge enhancement processor 5b so that eventually the distortion Dx at the coordinate position of the target pixel is fed to the amplification factor setter 64.

Figure 10:
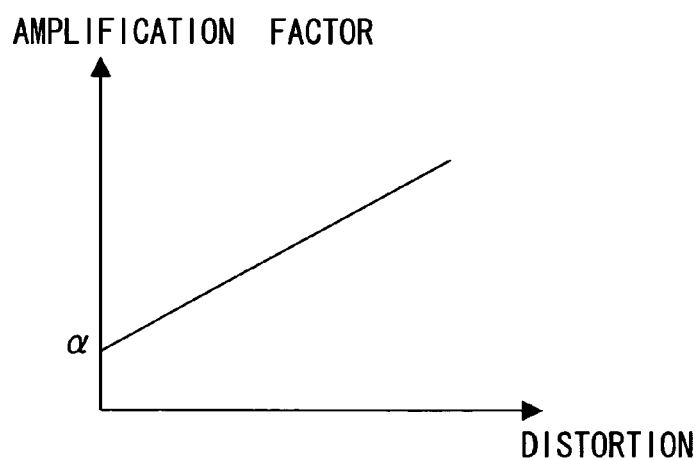
FIG. 10 is a graph showing the relationship between the distortion and the amplification factor for edge components.

Then, based on the relationship shown in FIG. 10, the amplification factor $\beta$ corresponding to the distortion Dx of the target pixel fed from the distortion calculator 53 is calculated. Incidentally, FIG. 10 is a graph showing the relationship between the amplification factor $\beta$ and the distortion Dx, and shows that the amplification factor $\beta$ increases as the distortion Dx increases. In this way, the edge component amplified by the amplifier 63 is made to increase as the absolute value of the distortion Dx increases. Thus, the greater the absolute value of the distortion, the higher the degree of the edge enhancement performed.

3. Third Example of the Operation for Setting the Amplification Factor $\beta$

In this example, the amplification factor setter 64 receives the actual coordinates (x, y) calculated by the distortion coordinate calculator 54 provided in the distortion correction processor 5a; that is, it receives from the distortion coordinate calculator 54 the actual coordinates (x, y) of the coordinate position of the target pixel that is instructed to be read by the memory controller 61. Here, the actual coordinates (x, y) calculated by the distortion coordinate calculator 54 as corresponding to the ideal coordinates set by the ideal coordinate setter 51 may be delayed and then fed to the amplification factor setter 64 of the edge enhancement processor 5b so that eventually the actual coordinates (x, y) at the coordinate position of the target pixel are fed to the amplification factor setter 64.

When the actual coordinates (x, y) of the target pixel are received from the distortion coordinate calculator 54 in this way, assuming that those actual coordinates (x, y) are (xi+xd, yi+yd), the coordinate positions (xi, yi), (xi, yi+1), (xi+1, yi), and (xi+1, yi+1) of the interpolation-oriented surrounding pixels for the actual coordinates (x, y) are identified. Specifically, if xd and yd are both equal to 0, as shown in FIG. 7A, the actual coordinates (x, y) are identified as identical with the pixel at the coordinate position (xi, yi). If xd is equal to 0 but yd is not equal to 0, as shown in FIG. 7B, the two pixels at the coordinate positions (xi, yi) and (xi, yi+1) are identified as interpolation-oriented surrounding pixels. If yd is equal to 0 but xd is not equal to 0, as shown in FIG. 7C, the two pixels at the coordinate positions (xi, yi) and (xi+1, yi) are identified as interpolation-oriented surrounding pixels. If xd and yd are both not equal to 0, as shown in FIG. 7D, the four pixels at the coordinate positions (xi, yi), (xi, yi+1), (xi+1, yi), and (xi+1, yi+1) are identified as interpolation-oriented surrounding pixels.

Figure 11:
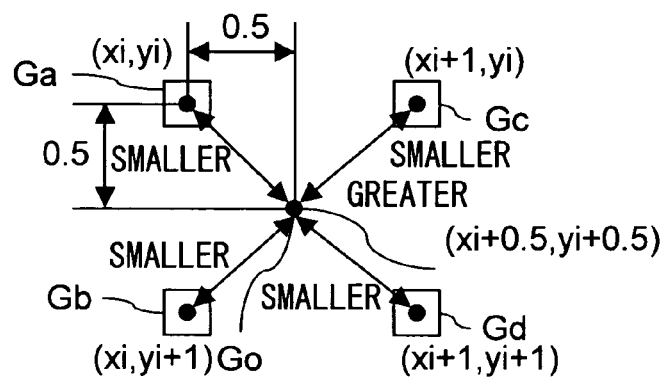
FIG. 11 is a graph showing the relationship between the coordinate position and the amplification factor for edge components.

When the coordinate positions of the interpolation-oriented surrounding pixels for the actual coordinates (x, y) of the target pixel are identified in this way, then the horizontal and vertical positional relationship between the identified interpolation-oriented surrounding pixels and the target pixel is checked. Here, as shown in FIG. 11, the amplification factor β is so set as to increase the closer the actual coordinates (x, y) of the target pixel are to the central position Go among the interpolation-oriented surrounding pixels Ga to Gd located at the coordinate positions (xi, yi), (xi, yi+1), (xi+1, yi), and (xi+1, yi+1). That is, the closer the horizontal and vertical interpolation coefficients xd and yd, respectively, calculated by the interpolation coefficient calculator 55 provided in the distortion correction processor 5a are to 0.5, the greater the amplification factor β. Here, the relationship between β and the interpolation coefficients xd and yd may be given by any of the formulae noted below, where α and β0 are constants, and α is a positive number.

$$\beta = \beta 0 \times (0.5 - |xd - 0.5|) \times (0.5 - |yd - 0.5|) + \alpha$$

$$\beta = 0 \times ((0.5 - |xd - 0.5|) + (0.5 - |yd - 0.5|)) + \alpha$$

$$\beta = \beta 0 \times ((0.5 - |xd - 0.5|)^2 + (0.5 - |yd - 0.51|)^2)^{1/2} + \alpha$$

By making the amplification factor setter 64 perform the operations of one of the first to third examples described above, it is possible to set the amplification factor β optimal to each pixel. When the amplification factor β is set by the amplification factor setter 64 in this way, the operations of the first to third examples may be performed in a combined manner. For example, the first and third examples may be combined so that, after the amplification factor β is set according to the image height of the target pixel as in the first example, the amplification factor β is set according to the actual coordinates of the target pixel as in the third example. Alternatively, the second and third examples may be combined so that, after the amplification factor β is set according to the distortion of the target pixel as in the second example, the amplification factor β is set according to the actual coordinates of the target pixel as in the third example.

In this embodiment, in the signal processor 5, first the distortion correction processor 5a performs distortion correction and then the edge enhancement processor 5b performs edge enhancement. Alternatively, it is also possible to first make the edge enhancement processor 5b perform edge enhancement and then make the distortion correction processor 5a perform distortion correction.

Third Embodiment

Figure 12:
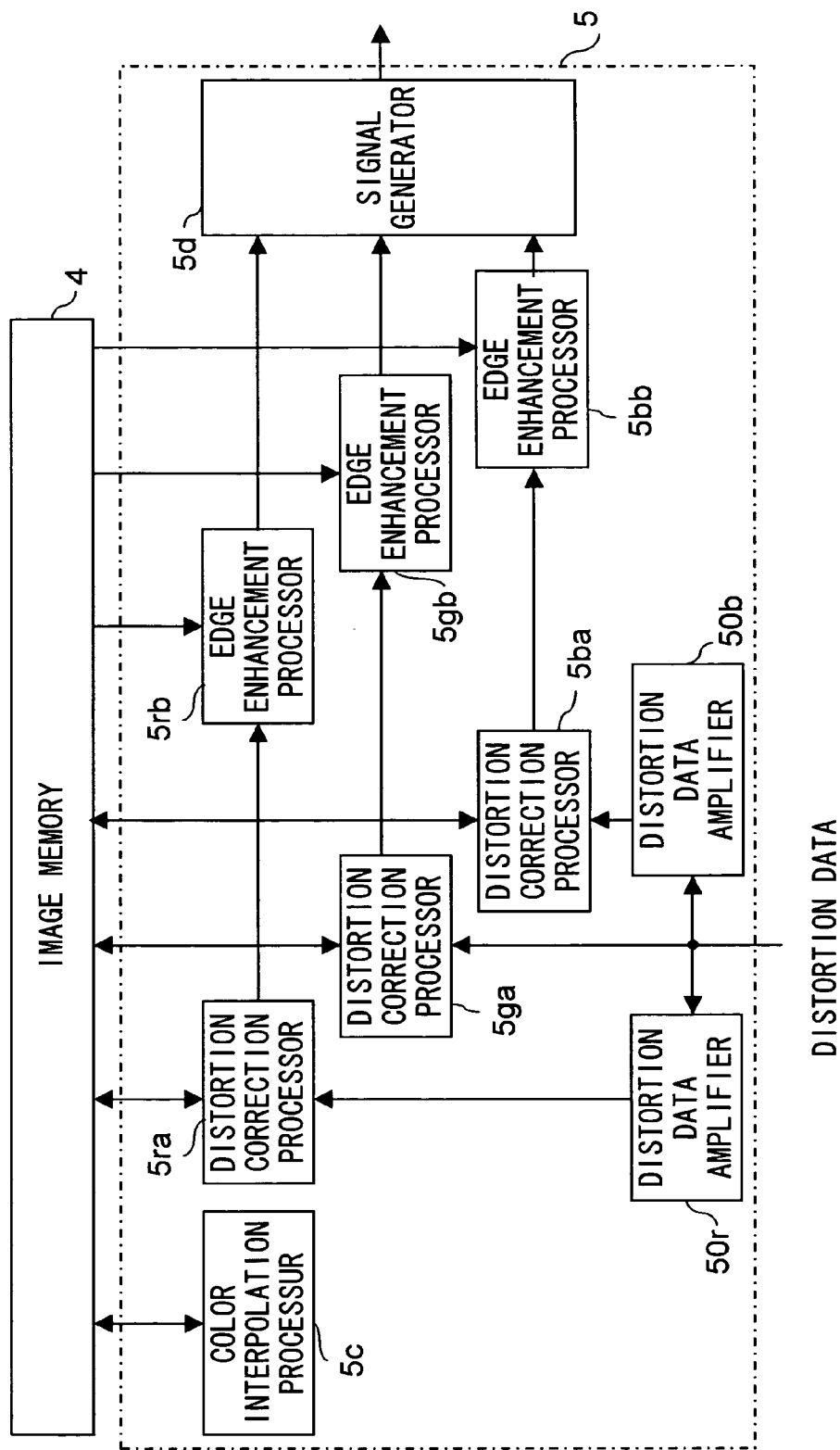
FIG. 12 is a block diagram showing the internal configuration of the signal processor in the image sensing device of the third embodiment.

A third embodiment of the present invention will be described below with reference to the drawings. The image sensing device of this embodiment is, as in the first embodiment, configured as shown in FIG. 1. FIG. 12 is a block diagram showing the internal configuration of the signal processor provided in the image sensing device of this embodiment. The image sensing device of this embodiment differs from the image sensing device of the second embodiment in that the signal processor 5 performs not only distortion correction and edge enhancement but also chromatic aberration correction. Thus, in this embodiment, except the signal processor 5, all the circuit blocks are configured in the same manners and operate in the same manners as in the first and second embodiments; therefore, for their explanations, those given earlier in connection with the first and second embodiments are to be referred to, and no detailed explanations will be repeated.

In the image sensing device of this embodiment, different color filters are provided on the surfaces of the individual pixels of the solid-state image sensor 2 so that different chrominance signals are outputted from any two horizontally or vertically adjacent pixels of the solid-state image sensor 2. That is, a single-panel filter composed of a plurality of types of color filter is provided on the pixel surface of the solid-state image sensor 2. In this embodiment, the single-panel filter provided on the solid-state image sensor 2 is a Bayer-type color filter having R (red), G (green), and B (blue) color filters arrayed as shown in FIG. 13.

In the image sensing device of this embodiment, as shown in FIG. 12, the signal processor 5 is provided with: distortion correction processors 5ra, 5ga, and 5ba each configured like the distortion correction processor 5a used in the first embodiment; edge enhancement processors 5rb, 5gb, and 5bb each configured like the edge enhancement processor 5b used in the second embodiment; a color interpolation processor 5c that performs interpolation based on the data of surrounding pixels for each of different chrominance signals (R, G, and B signals); a signal generator 5d that generates a brightness signal and color-difference signals from the different chrominance signals; and distortion data amplifiers 50r and 50b that amplify or attenuate the distortion data according to the ratios between the refractive indices of the different chrominance signals.

With the signal processor 5 configured as described above, the color interpolation processor 5c reads, from the image signal stored in the image memory 4 so that different actual coordinates correspond to different addresses therein, the data of one pixel after another. Then, based on the coordinate position from which the data was read out, the color interpolation processor 5c checks whether the signal currently of interest is an R, G, or B signal. If it is an R signal, the G and B signals for the pixel are generated through interpolation based on surrounding pixels; if it is a G signal, the R and B signals for the pixel are generated through interpolation based on surrounding pixels; and, if it is a B signal, the R and G signals for the pixel are generated through interpolation based on surrounding pixels. Thus, R, G, and B signals are generated for each pixel, and are then stored in the image memory 4 at the addresses corresponding to the actual coordinates.

Figure 14A:
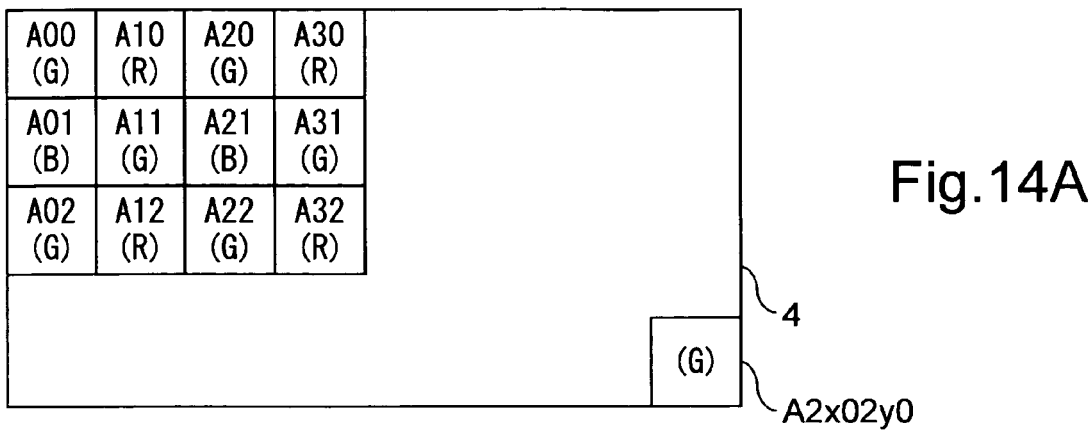
FIGS. 14A and 14B are diagrams showing the states of the image signal stored in the image memory before and after color correction.

The following description deals with a method of generating R, G, and B signals through the simplest method of interpolation. As shown in FIG. 14A, in the image memory 4, R, G, and B signals are stored at addresses A00 to A2xo2yo corresponding to the actual coordinates (0, 0) to (2x0, 2y0) at which those signals are respectively outputted. When the R signal at the pixel position Pxy of a pixel targeted for color interpolation is read out, assuming that pixels that output R, G, and B signals are arranged as shown in FIG. 15A, the G signal for the pixel position Pxy is generated through interpolation performed among the G signals of the four pixels at the pixel positions P(x−1)y, P(x+1)y, Px(y−1), and Px(y+1) that are horizontally and vertically adjacent to one another, and the B signal for the pixel position Pxy is generated through interpolation performed among the B signals of the four pixels at the pixel positions P(x−1)(y−1), P(x−1)(y+1), P(x+1)(y−1), and P(x+1)(y+1) that are diagonally adjacent to one another.

Figures 15A, 15B, 15C, 15D:
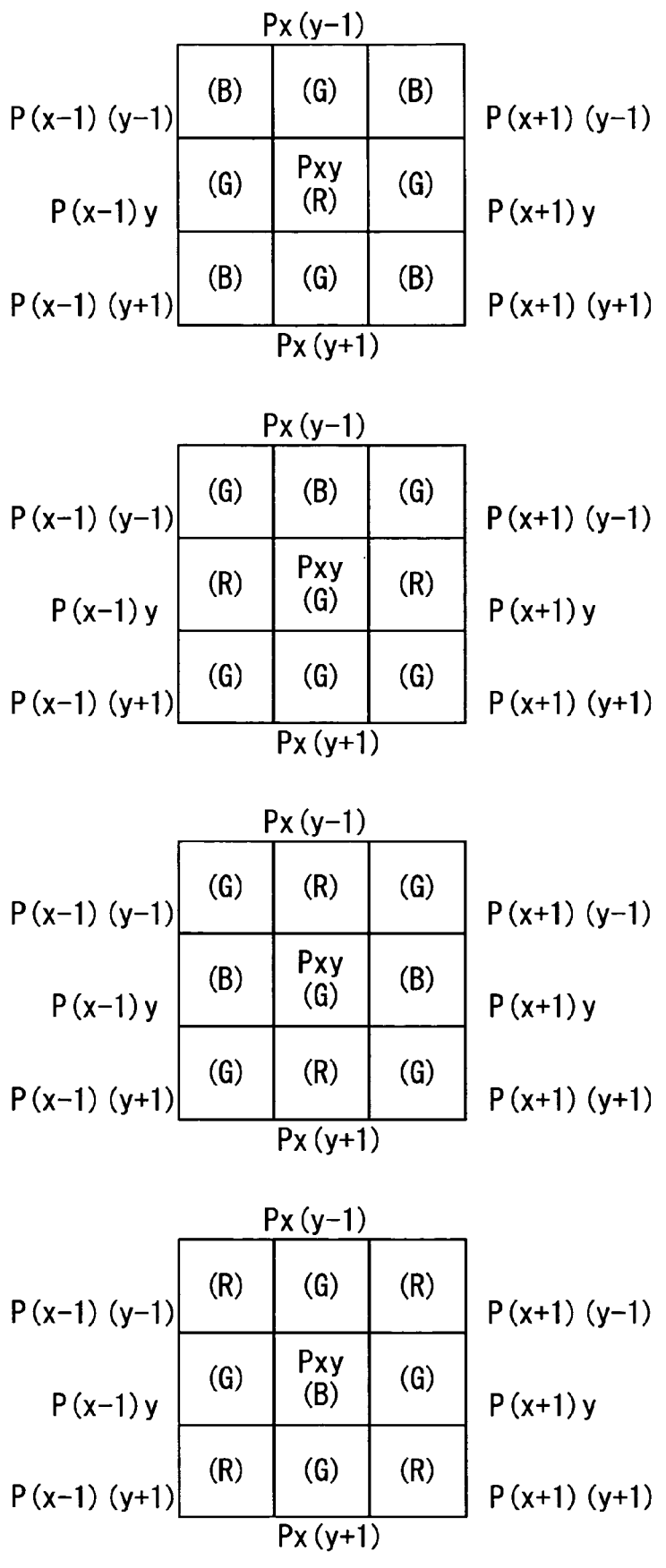

When the G signal at the pixel position Pxy of a pixel targeted for color interpolation is read out, assuming that pixels that output R, G, and B signals are arranged as shown in FIG. 15B, the R signal for the pixel position Pxy is generated through interpolation performed between the R signals of the two pixels at the pixel positions P(x−1)y and P(x+1)y that are horizontally adjacent to each other, and the B signal for the pixel position Pxy is generated through interpolation performed between the B signals of the two pixels at the pixel positions Px(y−1) and Px(y+1) that are vertically adjacent to each other. On the other hand, assuming that pixels that output R, G, and B signals are arranged as shown in FIG. 15C, the R signal for the pixel position Pxy is generated through interpolation performed between the R signals of the two pixels at the pixel positions Px(y−1) and Px(y+1) that are vertically adjacent to each other, and the B signal for the pixel position Pxy is generated through interpolation performed between the B signals of the two pixels at the pixel positions P(x−1)y and P(x+1)y that are horizontally adjacent to each other.

When the B signal at the pixel position Pxy of a pixel targeted for color interpolation is read out, assuming that pixels that output R, G, and B signals are arranged as shown in FIG. 15D, the G signal for the pixel position Pxy is generated through interpolation performed among the G signals of the four pixels at the pixel positions P(x−1)y, P(x+1)y, Px(y−1), and Px(y+1) that are horizontally and vertically adjacent to one another, and the R signal for the pixel position Pxy is generated through interpolation performed among the R signals of the four pixels at the pixel positions P(x−1)(y−1), P(x−1)(y+1), P(x+1)(y−1), and P(x+1)(y+1) that are diagonally adjacent to one another. In FIGS. 14A, 14B, and 15A to 15D, the bracketed letters "(R)", "(G)", and "(B)" respectively indicate R, G, and B signals.

When, as a result of color interpolation performed by using the chrominance signals of surrounding pixels, the chrominance signals of the colors other than the one outputted from the target pixel are generated in this way, the resulting R, G, and B signals are fed, for one pixel after another, from the color interpolation processor 5c to the image memory 4. The R, G, and B signals generated for the individual pixels are stored at the addresses corresponding to the actual coordinates (x, y) in memory regions 4r, 4g, and 4b allotted respectively to R, G, and B signals within the image memory 4.

Figure 14B:
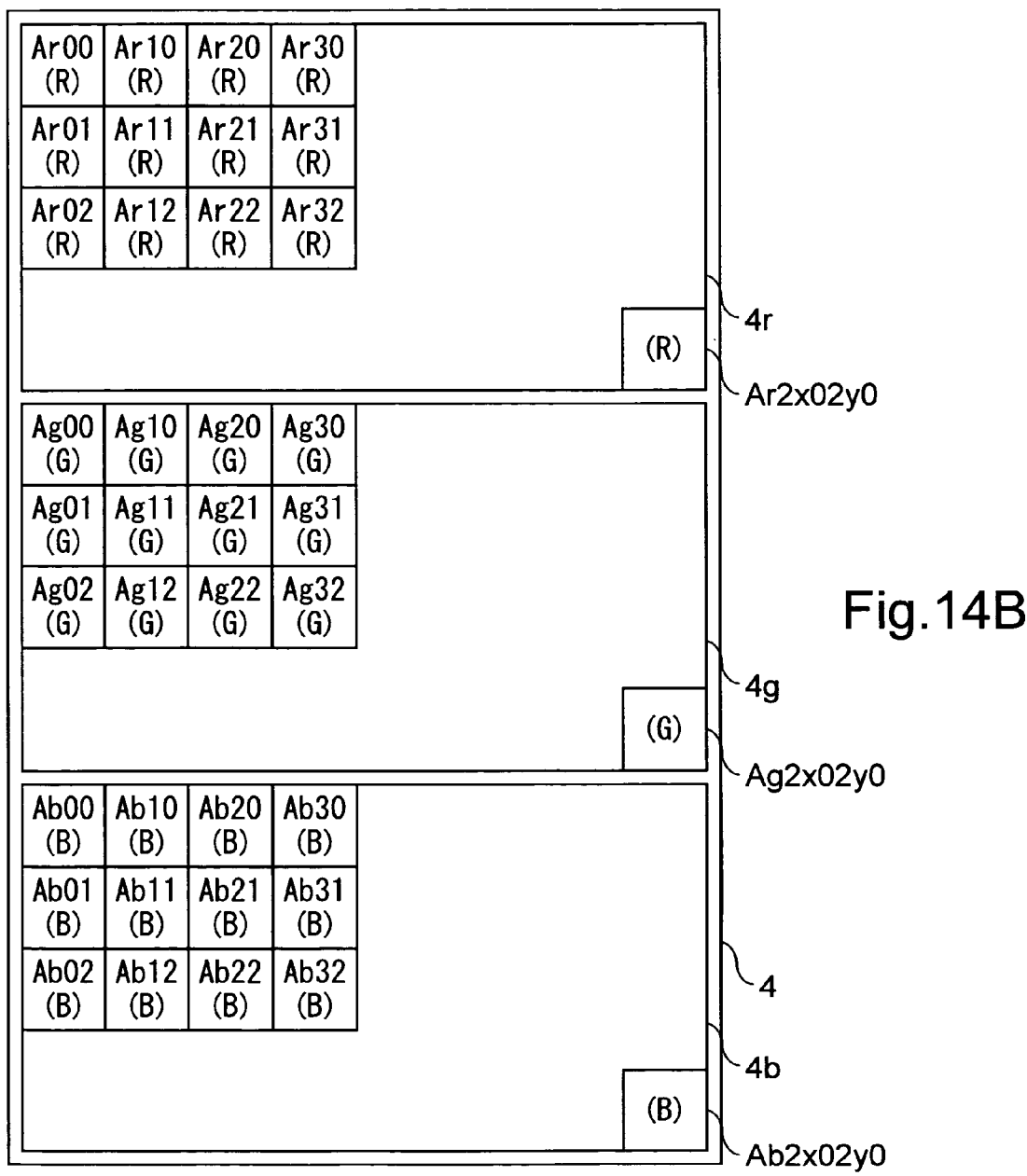

Specifically, as shown in FIG. 14B, the R signals at the pixel positions of the individual actual coordinates (0, 0) to (2x0, 2y0) are stored in the memory region 4r at addresses Ar00 to Ar2xo2yo corresponding to the actual coordinates (0, 0) to (2x0, 2y0), the G signals at the pixel positions of the individual actual coordinates (0, 0) to (2x0, 2y0) are stored in the memory region 4g at addresses Ag00 to Ag2xo2yo corresponding to the actual coordinates (0, 0) to (2x0, 2y0), and the B signals at the pixel positions of the individual actual coordinates (0, 0) to (2x0, 2y0) are stored in the memory region 4b at addresses Ab00 to Ab2xo2yo corresponding to the actual coordinates (0, 0) to (2x0, 2y0).

When the R, G, and B signals generated as corresponding to the individual actual coordinates by the color interpolation processor 5c through color interpolation are stored in the image memory 4 in this way, the distortion correction processors 5ra, 5ga, and 5ba operate in the same manner as the distortion correction processor 5a in the first embodiment to perform distortion correction on the R, G, and B signals individually. Here, if the distortion data selected from the distortion data memory 8 by the selector 9 are for G signals, those distortion data are fed directly to the distortion correction processor 5ga. Moreover, the distortion data amplifier 50r amplifies or attenuates the distortion data fed from the selector 9 by an amplification factor calculated based on the ratio of the refractive indices for R and G signals, and then feeds the results to the distortion correction processor 5ra. Likewise, the distortion data amplifier 50b amplifies or attenuates the distortion data fed from the selector 9 by an amplification factor calculated based on the ratio of the refractive indices for B and G signals, and then feeds the results to the distortion correction processor 5ba.

Thus, the distortion correction processor 5ra, by using the data stored in the memory region 4r, performs distortion correction based on the distortion data from the distortion data amplifier 50r and thereby generates the data corresponding to the individual ideal coordinates (0, 0) to (2x0, 2y0). Then, the distortion-corrected R signal data corresponding to the individual ideal coordinates (0, 0) to (2x0, 2y0) are stored at the addresses corresponding to their coordinate positions in the memory region 4r in the image memory 4. Likewise, the distortion correction processor 5ga, by using the data stored in the memory region 4g, performs distortion correction based on the distortion data fed directly from the selector 9 and thereby generates the data corresponding to the individual ideal coordinates (0, 0) to (2x0, 2y0). Then, the distortion-corrected G signal data corresponding to the individual ideal coordinates (0, 0) to (2x0, 2y0) are stored at the addresses corresponding to their coordinate positions in the memory region 4g in the image memory 4.

Moreover, the distortion correction processor 5ba, by using the data stored in the memory region 4b, performs distortion correction based on the distortion data from the distortion data amplifier 50b and thereby generates the data corresponding to the individual ideal coordinates (0, 0) to (2x0, 2y0). Then, the distortion-corrected B signal data corresponding to the individual ideal coordinates (0, 0) to (2x0, 2y0) are stored at the addresses corresponding to their coordinate positions in the memory region 4b in the image memory 4. As a result of the distortion correction processors 5ra, 5ga, and 5ba operating individually in this way, it is possible to correct also for chromatic aberrations resulting from differences among the refractive indices for different chrominance signals.

When the distortion-corrected data of the R, G, and B signals corresponding to the individual ideal coordinates (0, 0) to (2x0, 2y0) are stored in their respective memory regions 4r, 4g, and 4b in the image memory 4 in this way, the edge enhancement processors 5rb, 5gb, and 5bb operate in the same manner as the edge enhancement processor 5b in the second embodiment to perform edge enhancement on the R, G, and B signals individually. Here, the edge enhancement processors 5rb, 5gb, and 5bb are fed with the image heights, distortion, and actual coordinates calculated by the distortion correction processors 5ra, 5ga, and 5ba, respectively, and the amplification factors at the individual ideal coordinates are set.

Thus, the edge enhancement processor 5rb, based on the image heights, distortion, and actual coordinates calculated by the distortion correction processor 5ra, calculates the amplification factors corresponding to the individual ideal coordinates (0, 0) to (2x0, 2y0). Then, by using the data stored in the memory region 4r as corresponding to the individual ideal coordinates (0, 0) to (2x0, 2y0), the edge enhancement processor 5rb performs edge enhancement at the amplification factors set for those ideal coordinates.

Likewise, the edge enhancement processor 5gb, based on the image heights, distortion, and actual coordinates calculated by the distortion correction processor 5ga, calculates the amplification factors corresponding to the individual ideal coordinates (0, 0) to (2x0, 2y0). Then, by using the data stored in the memory region 4g as corresponding to the individual ideal coordinates (0, 0) to (2x0, 2y0), the edge enhancement processor 5gb performs edge enhancement at the amplification factors set for those ideal coordinates.

Moreover, the edge enhancement processor 5bb, based on the image heights, distortion, and actual coordinates calculated by the distortion correction processor 5ba, calculates the amplification factors corresponding to the individual ideal coordinates (0, 0) to (2x0, 2y0). Then, by using the data stored in the memory region 4b as corresponding to the individual ideal coordinates (0, 0) to (2x0, 2y0), the edge enhancement processor 5bb performs edge enhancement at the amplification factors set for those ideal coordinates.

The R, G, and B signals at the individual ideal coordinates (0, 0) to (2x0, 2y0) thus edge-enhanced by the edge enhancement processors 5rb, 5gb, and 5bb, respectively, are then fed to the signal generator 5d. By using the R, G, and B signals at the ideal coordinates (0, 0) to (2x0, 2y0) of the individual pixels, the signal generator 5d then generates a brightness signal and color-difference signals, which are then fed to the D/A converter 6.

In this embodiment, in the signal processor 5, first the color interpolation processor 5c performs color interpolation and then the distortion correction processors 5ra, 5ga, and 5ba and the edge enhancement processors 5rb, 5gb, and 5bb perform distortion correction and edge enhancement. Alternatively, as in the second embodiment, it is also possible to first make the distortion correction processor 5a and the edge enhancement processor 5b perform distortion correction and edge enhancement and then make the color interpolation processor 5c perform color interpolation. In this case, the distortion correction processor 5a and the edge enhancement processor 5b set, for the individual ideal coordinates, the distortion data corresponding to the different chrominance signals, and then perform distortion correction and edge enhancement.

In the distortion data amplifiers 50r and 50b, the distortion data selected by the selector 9 are converted into distortion data corresponding to R and B signals. Alternatively, distortion data corresponding respectively to R, G, and B signals may be selected by the selector 9 and then fed to the distortion correction processors 5ra, 5ga, and 5ba. The chrominance signals mentioned above may be R, G, and B signals obtained from a three-panel image sensing device that incorporates separate solid-state image sensors 2 to output separate image signals for different colors and that thus requires no color interpolation. The color filter mentioned above may be a complementary-color type filter.

Fourth Embodiment

Figure 16:
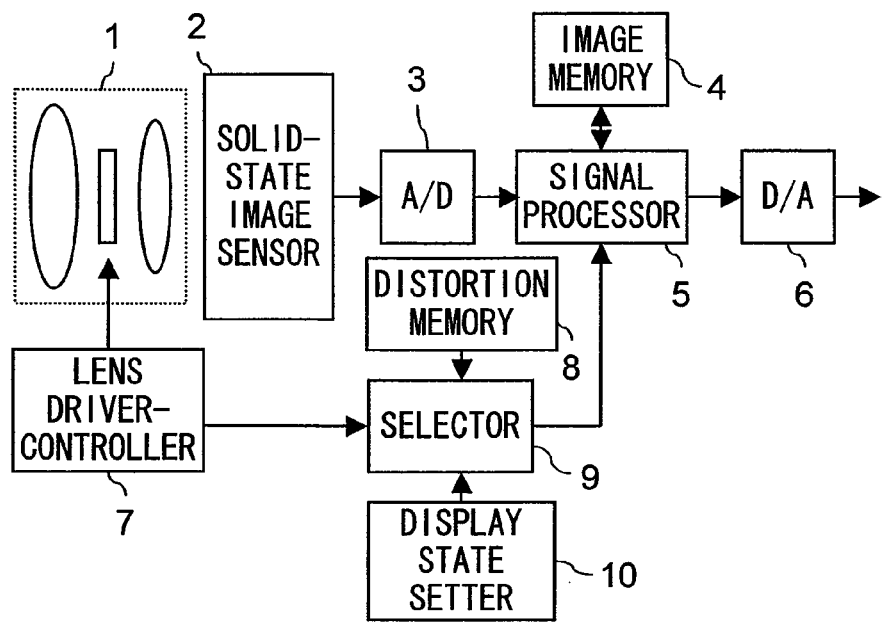
FIG. 16 is a block diagram showing the internal configuration of the signal processor in the image sensing device of the fourth embodiment.

A fourth embodiment of the present invention will be described below with reference to the drawings. FIG. 16 is a block diagram showing the internal configuration of the image sensing device of this embodiment.

The image sensing device of this embodiment differs from the image sensing devices (FIG. 1) of the first to third embodiments in that it is provided with a display state setter 10, and that a signal set by the display state setter 10 to indicate the state of an image is fed to the selector 9. That is, by operating the display state setter 10, it is possible to intentionally display an image with barrel-shaped or pincushion-shaped distortion.

Here, when the signal set by the display state setter 10 to indicate the display state of the image is fed to the selector 9, the selector 9 selects the distortion data stored in the distortion data memory 8 according to the zoom position and focus position of the lenses in the optical system 1 as set by the lens driver-controller 7 and the display state of the image as set by the display state setter 10. Thus, the distortion correction processor 5a (including the distortion correction processors 5ra, 5ga, and 5ba used in the third embodiment) provided in the signal processor 5 generates an image signal according to the display state of the image as set by the display state setter 10.

Here, alternatively, the selector 9 may determine the distortion data to be fed to the distortion correction processor 5a by reading from the distortion data memory 8 the distortion data determined according to the zoom position and focus position of the lenses in the optical system 1 and the distortion data identified based on the display state of the image as set by the display state setter 10.

Specifically, in this case, the distortion data based on the image height-distortion curve determined according to the zoom position and focus position of the lenses in the optical system 1 and the distortion data based on the image height-distortion curve determined by expressing as actual coordinates the display state of the image as set by the display state setter 10 are read out from the distortion data memory 8. Then, between the distortion data of the respective curves thus read out, the correlation of distortion data at equal image heights is checked, and then, by exploiting this correlation, the distortion correction processor 5a generates distortion data to be used for distortion correction.

Figure 17A:
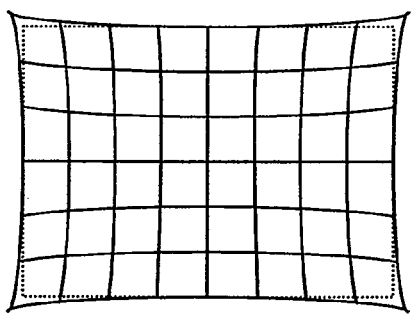
FIGS. 17A and 17B are diagrams illustrating pincushion-shaped and barrel-shaped distortion.
Figure 17B:
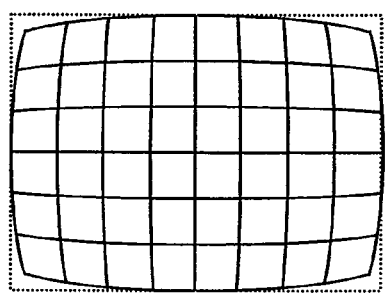

As described above, in this embodiment, the display state setter 10 can set the display state of an image. Thus, for example, when an image signal fed from the solid-state image sensor 2 contains barrel-shaped distortion as shown in FIG. 17B, the signal processor 5 can intentionally convert it into an image signal containing pincushion-shaped distortion as shown in FIG. 17A and then output the result. In this embodiment, the only difference lies in how the selector 9 sets distortion data, and, in other respects, the signal processor 5 operates in the same manner as the signal processor 5 of any of the first to third embodiments.

Distortion correction devices and image sensing devices configured as described above find wide application in image sensing devices that shoot still or moving pictures. These image sensing devices may shoot monochrome or color pictures, and may record the image signals obtained by image sensing either as digital signals or as analog signals.

What is claimed is:

1. A distortion correction device that performs distortion correction on an inputted image signal by converting an input coordinate position, the input coordinate position being a coordinate position of the inputted image signal, the distortion correction device comprising:
 a distortion data memory that stores distortion data, the distortion data being discrete points on an image height-distortion curve representing a relationship between image height, which is a distance from the optical axis of the optical lens to an imaging position, and distortion, which shows correlation between an output coordinate position, the output coordinate position being a coordinate position of an outputted image signal, and the input coordinate position corresponding to the output coordinate position;

a distortion calculator that reads, out of the distortion data being the discrete points stored in the distortion data memory, a predetermined number of distortion data among the distortion data near an image height at the output coordinate position, that then calculates an approximation formula for approximating the image height-distortion curve near the image height at the output coordinate position, and that then substitute the image height at the output coordinate position in the approximation formula, the distortion calculator thereby calculating the distortion at the output coordinate position; and a coordinate calculator that calculates the input coordinate position based on the output coordinate position and the distortion calculated by the distortion calculator as corresponding to the output coordinate position, wherein as data of the output coordinate position, data of the input coordinate position obtained for the output coordinate position are outputted.

2. The distortion correction device of claim 1, further comprising:

an interpolation processor that, when data of an image signal corresponding to the input coordinate position calculated by the coordinate calculator is not inputted, a plurality of input coordinates near the input coordinate position where data exist are recognized as surrounding input coordinates, and that then interpolates data at the plurality of surrounding input coordinates based on a positional relationship between the plurality of surrounding input coordinates and the input coordinate position calculated by the coordinate calculator, the interpolation processor thereby generating data at the input coordinate position calculated by the coordinate calculator.

3. The distortion correction device of claim 1, wherein the distortion calculator calculates the approximation formula by reading out four distortion data near the image height at the output coordinate position.

4. The distortion correction device of claim 3, further comprising:

an image height calculator that calculates the image height corresponding to the output coordinate position, wherein the distortion calculator reads from the distortion data memory, as a first distortion data, a distortion data having an image height close to and smaller than the image height calculated by the image height calculator, reads from the distortion data memory, as a second distortion data, a distortion data having an image height close to and greater than the image height calculated by the image height calculator, reads from the distortion data memory, as a third distortion data, a distortion data having an image height close to and smaller than the image height of the first distortion data corresponding to the output coordinate position, reads from the distortion data memory, as a forth distortion data, a distortion data having an image height close to and greater than the image height of the second distortion data corresponding to the output coordinate position, and calculates as the approximation formula a cubic equation by using the first to fourth distortion data.

5. The distortion correction device of claim 4, wherein the distortion calculator confirms fulfillment of a first condition that provides that a slope of a line described by the second and third distortion data be equal to a slope of a tangent line to the calculated approximation formula at the first distortion data, confirms fulfillment of a second condition that provides that a slope of a line described by the first and fourth distortion data be equal to a slope of a tangent line to the calculated approximation formula at the second distortion data, confirms fulfillment of a third condition that provides that the approximation formula passes through the first and second distortion data, and determines as the approximation formula a cubic equation that fulfills the first to third conditions.

6. An image sensing device comprising:

an optical system built with a lens;

a lens driver-controller for changing a position of the lens of the optical system; and a distortion correction processor that performs distortion correction on an inputted image signal by converting an input coordinate position, the input coordinate position being a coordinate position of the inputted image signal, wherein the distortion correction processor comprises:

a distortion data memory that stores a plurality of sets of distortion data, the distortion data being discrete points on an image height-distortion curve representing a relationship between image height, which is a distance from the optical axis of the optical lens to an imaging position, and distortion, which shows correlation between an output coordinate position, the output coordinate position being a coordinate position of an outputted image signal, and the input coordinate position corresponding to the output coordinate position;

a distortion calculator that reads, out of the distortion data being the discrete points stored in the distortion data memory, a predetermined number of distortion data among the distortion data near an image height at the output coordinate position, that then calculates an approximation formula for approximating the image height-distortion curve near the image height at the output coordinate position, and that then substitute the image height at the output coordinate position in the approximation formula, the distortion calculator thereby calculating the distortion at the output coordinate position; and a coordinate calculator that calculates the input coordinate position based on the output coordinate position and the distortion calculated by the distortion calculator as corresponding to the output coordinate position, the distortion correction processor outputting, as data of the output coordinate position, data of the input coordinate position obtained for the output coordinate position, and wherein, according to the position of the lens set by the lens driver-controller, which of the sets of distortion data to read out from the distortion data memory is determined.

7. The image sensing device of claim 6, further comprising:

an edge enhancement processor that performs edge enhancement on the input image signal in different degrees at different pixel positions.

8. The image sensing device of claim 7, wherein parameters used in the edge enhancement are set according to the image height at the output coordinate position of a target pixel.

9. The image sensing device of claim 7, wherein parameters used in the edge enhancement are set according to the distortion at the output coordinate position of a target pixel.

10. The image sensing device of claim 7,
wherein parameters used in the edge enhancement are set according to the input coordinate position calculated as corresponding to the output coordinate position of a target pixel.

11. The image sensing device of claim 6,
wherein the solid-state image sensor outputs an image signal including a plurality of chrominance signals, and the distortion correction processor calculates for the different chrominance signals approximation formulae based on different image height-distortion curves by using distortion data corresponding to the different chrominance signals.

12. The image sensing device of claim 6,
wherein the distortion data read out from the distortion data memory are set according to a degree in which to intentionally distort an image represented by the outputted image signal.

* * * * *